United States Patent [19]

Miyamoto et al.

[11] 4,438,257

[45] Mar. 20, 1984

[54] PROCESS FOR PREPARING POLYAMIDE WITH MOLTEN DICARBOXYLIC ACID COMPONENT

[75] Inventors: Akira Miyamoto; Senzo Shimizu; Masahiro Harada; Tamotu Ajiro; Hideki Hara, all of Kanagawa, Japan

[73] Assignee: Mitsubishi Gas Chemical Co., Ltd., Tokyo, Japan

[21] Appl. No.: 451,397

[22] Filed: Dec. 20, 1982

[30] Foreign Application Priority Data

Dec. 25, 1981 [JP] Japan ................. 56-211767

[51] Int. Cl.³ ............................................. C08G 69/28
[52] U.S. Cl. ................................. 528/347; 528/335; 528/339; 528/340; 526/68; 526/71
[58] Field of Search .................. 528/347, 335; 526/68, 526/71

[56] References Cited

U.S. PATENT DOCUMENTS 2,840,547  6/1958  Stump ................. 528/347

*Primary Examiner*—Harold D. Anderson
*Attorney, Agent, or Firm*—Browdy & Neimark

[57] ABSTRACT

A process for preparing a polyamide is provided. The polyamide is prepared by causing a dicarboxylic acid and a diamine to polycondensate directly under an atmosphere of an inert gas at atmospheric pressure. The polycondensation reaction is mainly carried out in two diamine component-adding steps, one step comprising adding part of the diamine to the molten dicarboxylic acid until the molar ratio of the diamine to the dicarboxylic acid is brought to within the range of from 0.900 to 0.990 while raising continuously the temperature of the reaction mixture to a temperature not exceeding about 5° C. above the melting point of the object polyamide and the other step comprising adding the remainder of the diamine to the reaction mixture maintained at a temperature higher than about 10° C., but not exceeding about 35° C. above the melting point of the object polyamide until the overall molar ratio of the diamine to the dicarboxylic acid is brought to within the range of from 0.995 to 1.005.

12 Claims, No Drawings

PROCESS FOR PREPARING POLYAMIDE WITH MOLTEN DICARBOXYLIC ACID COMPONENT

BACKGROUND OF THE INVENTION

1. Field of the Invention

The present invention relates to a new process for preparing a polyamide by direct polycondensation reaction of a diamine component and a dicarboxylic acid component. More particularly, the present invention relates to a process for preparing a polyamide economically which comprises mixing a molten dicarboxylic acid component containing adipic acid as a main component and a diamine component containing m-xylylene diamine as an another main component, and reacting them directly at a controlled temperature and at atmospheric pressure.

2. Description of the Prior Art

In general, a polyamide is produced by subjecting an aqueous solution of the salt formed from a dicarboxylic acid and a diamine (the so-called nylon salt) to polycondensation reaction at a temperature just sufficient to polycondense the salt under pressure while distilling water away, which is used as a solvent of the nylon salt, and is formed by polycondensation of the salt.

The above conventional method requires not only much heat and extremely long periods of time for the reaction to remove water, but also the yield obtained per one batch is low, and thus it is uneconomical. Furthermore, in order to produce a polyamide having high quality by this conventional method, there are many problems to be solved. For example, polymer deposits are formed on the wall of the reaction vessel owing to the remarkable change in the liquid level of the reaction solution during the reaction, and the deposited polymer can be locally overheated and tends to degrade.

As a method of eliminating those drawbacks, it has been proposed that the nylon salt be directly subjected to polycondensation reaction without using any solvent. See, Japanese Patent Publication (Kokoku) Nos. 35-15700 and 43-22874. However, these methods are not much more efficient, because they require the steps for the isolation of the nylon salt and the purification thereof in using the same. Also U.S. Pat. No. 2,840,547 discloses a method in which a diamine and a dicarboxylic acid are directly mixed and the mixture is brought to polycondensation reaction under pressure. Further, Japanese Patent Publication (Kokai) No. 48-12390 discloses a method in which a molten diamine containing a small amount of water is mixed with a molten dicarboxylic acid at a temperature of less than 220° C. at atmospheric pressure, while the polycondensation reaction is effected under such conditions that the polycondensation reaction proceeds as slowly as possible.

However, a method comprising subjecting only a diamine and a dicarboxylic acid directly to polycondensation reaction at atmospheric pressure to produce a polyamide economically has, surprisingly, not been put into practice until now. It is considered to be mainly due to the following reasons.

Firstly, in the case that the mixture of a dicarboxylic acid and a diamine is directly subjected to polycondensation reaction at atmospheric pressure, if the reaction mixture containing the starting materials is maintained in a uniformly fluidized state, it becomes difficult to avoid the loss of the diamine by evaporation. This causes the molecular weight of the product to vary from batch to batch. In order to prevent this loss, the reaction system must be kept under pressure with steam. This means naturally that the apparatus for the polycondensation reaction must withstand the applied pressure, and the procedures of the polycondensation reaction must include both steps of keeping the reaction system under pressure and under reduced pressure. This is disadvantageous because the apparatus and operation are complicated and, also, the reaction time is long, in comparison with the case of carrying out direct polycondensation reaction at atmospheric pressure.

Secondly, if a diamine is directly polycondensed with a dicarboxylic acid, the viscosity of the polyamide produced markedly increases as the reaction proceeds. The increase in viscosity causes the overall heat transfer coefficient, U, of the reaction vessel to fall so that the time required for increasing or decreasing the temperature of the vessel contents becomes relatively long. So, economical production of polyamide is markedly impeded by restrictions on size imposed on the apparatus used for such reaction.

As described above, in the industrial production of polyamide by a direct polycondensation process, improvements have been desired in practical use.

SUMMARY OF THE INVENTION

It is, therefore, a primary object of the present invention to provide a process for preparing a polyamide, specifically a polyamide derived from a dicarboxylic acid component containing adipic acid and a diamine component containing m-xylylene diamine, within a short time by direct polycondensation reaction at atmospheric pressure.

An another object of the present invention is to provide a process for preparing a polyamide by direct polycondensation reaction wherein a rise in the temperature of the reaction mixture is rapidly and efficiently carried out to retard effectively the increase in viscosity of the product during the reaction and the polycondensation is completed after the desired temperature has been established in the reaction mixture, thereby rationalizing the production processes.

In accordance with the present invention, there is provided a process for preparing a polyamide which comprises effecting directly polycondensation reaction of a diamine component containing at least 70 mole % of m-xylylene diamine with a dicarboxylic acid component containing at least 80 mole % of adipic acid at atmospheric pressure, characterized in that it comprises the steps of: (a) heating the dicarboxylic acid component to a temperature higher than the melting point thereof to melt it; (b) adding part of the diamine component to the dicarboxylic acid component molten in the step (a) in an amount to bring the molar ratio of the diamine component to the dicarboxylic acid component to within the range of from 0.900 to 0.990 in the reaction mixture while raising the temperature of the reaction mixture to a temperature not exceeding about 5° C. above the melting point of the object polyamide; (c) after the addition of the diamine in the step (b) has been completed, raising the temperature of the reaction mixture to a temperature higher than about 10° C. above the melting point of the object polyamide, but not exceeding about 35° C. above the melting point of the object polyamide; and (d) adding the remainder of the diamine component to the reaction mixture maintained at the temperature defined in the step (c) in an amount to bring the overall molar ratio of the diamine component to the dicarboxylic acid component to within the range of from 0.995 to 1.005 to complete the polycondensation reaction.

According to the present invention, because a rise in the temperature of the reaction mixture is rapidly and efficiently carried out so that increase in viscosity of the reaction product is effectively retarded, it is possible to avoid the many difficulties encountered when marked increase in viscosity results during polycondensation, whereby the rationalization of the production processes for preparing a polyamide is achieved. Moreover, according to the present invention, it also becomes possible to prepare a polyamide by direct polycondensation of a dicarboxylic acid component and a diamine component at atmospheric pressure without using a solvent, and thus it becomes possible to shorten the reaction time, save energy (because no water is used as a solvent), and increase the charge amount of the starting materials as well as of the yield of the product. Accordingly, it can be said that the present invention has a most significant value in practical use.

DETAILED DESCRIPTION OF THE INVENTION

In carrying out the process of the present invention, it is desirable to meet the following requirements:
(1) Replacing substantially the atmosphere in a reaction vessel with an inert gas;
(2) Effecting reaction at a controlled temperature which is higher than the melting point of the dicarboxylic acid component and which can maintain the reaction mixture in a uniformly-fluidized state throughout the reaction; and
(3) Using a reaction vessel with a stirrer, a partial condenser and a total condenser connected to the partial condenser.

These desirable requirements are concretely described below together with other requirements.

In order to produce a polyamide having high quality according to the present invention, it is desirable to introduce an inert gas, such as nitrogen gas, into the reaction vessel to replace the atmosphere in the vessel with the gas prior to or after the feed of the dicarboxylic acid component. The dicarboxylic acid component may be fed to the reaction vessel either in a molten form or in a solid form, wherein the solid fed is melted by heating the vessel.

The dicarboxylic acid component which may be used in the present invention should contain at least 80 mole % of adipic acid. Other dicarboxylic acids which may be used in combination with adipic acid may be one or more of aliphatic dicarboxylic acids, for example, succinic acid, glutaric acid, pimelic acid, suberic acid, azelaic acid, sebacic acid, undecanedioic acid, dodecanedioic acid, and the like.

The diamine component which may be used together with the dicarboxylic acid component in the present invention should contain at least 70 mole % of m-xylylene diamine. Other diamines which may be used in combination with m-xylylene diamine may be one or more diamines selected from the group consisting of an aliphatic diamine, such as tetramethylene diamine, pentamethylene diamine, hexamethylene diamine, octamethylene diamine, nonamethylene diamine, and the like; an aliphatic diamine having an aromatic ring other than m-xylylene diamine, such as p-xylylene diamine and the like; an aromatic diamine, such as p-phenylene diamine, and the like; and an alicyclic diamine, such as 1,3-bisaminomethylcyclohexane, 1,4-bisaminomethylcyclohexane, and the like.

In the process according to the present invention, the dicarboxylic acid component is firstly heated to a temperature higher than its melting point and the polycondensation reaction between the dicarboxylic acid component and the diamine component is started at that temperature. In order to bring about substantially the polycondensation reaction between both the components it is desirable to raise the temperature to 160° C. or higher; such higher temperature makes it possible to maintain an oligoamide and/or a polyamide produced as an intermediate in a molten state, thereby maintaining the entire reaction mixture in a uniformly-fluidized state throughout the reaction.

According to the preferred embodiment of the present invention, the polycondensation reaction may be effected by stirring a molten dicarboxylic acid component in a reaction vessel and adding a diamine component to the stirred acid component at atmospheric pressure. The diamine component may be continuously added, preferably dropwise, to the molten dicarboxylic acid component maintained at a temperature higher than the melting point of the acid component. The amount of the diamine component to be added is that to bring the molar ratio of the diamine component to the dicarboxylic acid component to within the range of from 0.900 to 0.990, preferably from 0.930 to 0.980. During the addition of the diamine component, the temperature of the reaction mixture is raised to a temperature not exceeding about 5° C. above the melting point of the polyamide to be finally produced. The rise of temperature is preferably carried out in a continuous manner, but may be carried out stepwise. Preferably, the addition of the diamine component is completed before the temperature prescribed above is established in the reaction mixture.

After the addition of the diamine has been completed, the temperature of the reaction mixture is raised to a temperature higher than about 10° C. above the melting point of the polyamide to be finally produced, but not exceeding about 35° C. above the melting point of the produced polyamide. The rise of temperature is preferably carried out in a continuous manner, but may be carried out stepwise. The viscosity of the reaction mixture is maintained at a relatively low level by such heating, and thus a decrease of the overall heat transfer coefficient of the reaction vessel during the temperature-raising process can be effectively retarded.

After heating the reaction mixture to the above prescribed temperature, the remainder of the diamine component is added to the reaction mixture having an increased temperature to complete the polycondensation reaction to obtain the desired polyamide. The amount of the diamine component to be added at this stage is selected so as to finally bring the overall molar ratio of the diamine component to the dicarboxylic acid component to within the range of from 0.995 to 1.005 in the reaction mixture.

The rate of adding the diamine component in each of the two adding steps is chosen so as to establish a given temperature in the reaction mixture, namely the temperature which enables to maintain the reaction mixture in a uniformly-fluidized state throughout the reaction. This rate of addition may be affected by the heat generated by the polycondensation reaction between the dicarboxylic acid component and the diamine component described above; the heat required for the distillation and removal of water formed by the above polycondensation reaction; the heat supplied from the heating medium used as a heat source to the reaction mixture through the wall of the reaction vessel; the structure and operation of a partial condenser and total condenser for separating the generated water from the reaction mixture; and so on.

In the first adding step of the diamine component, the time required for adding the diamine to the reaction mixture varies depending upon the size of the reaction vessel, but it is usually in the range of from 0.5 to 10 hours. During this period, water, which is being generated and evaporated with the progress of polycondensation reaction, may be distilled away and removed from the reaction mixture through the partial condenser and total condenser. The temperature of the distillate through the partial condenser is preferably held to within the range of from 100° to 120° C. The starting materials evaporated durng the reaction, for example, m-xylylene diamine and adipic acid, may be separated from water by the partial condenser and then returned to the reaction vessel.

In the second adding step of the remainder of the diamine component, the time required for the addition of the diamine component is, in general, in the range of from about 10 to 60 minutes.

After completing the addition of the diamine component in this step, the reaction mixture may preferably be allowed to stand at the temperature prescribed above to complete the reaction. In another preferred embodiment, the reaction mixture may be allowed to stand under reduced pressure at the prescribed temperature to complete the reaction after adding the diamine component.

In carrying out the process of the present invention, the apparatus for polycondensation reaction is preferably provided with a partial condenser, because if a partial condenser not used, it is difficult to avoid the loss of diamine component from the reaction mixture by evaporation. The use of the partial condenser makes it possible to effectively prevent the loss of the diamine component containing m-xylylene diamine, whereby the production of a polyamide having the predetermined molecular weight with good reproducibility becomes possible when, in particular, the molar ratio of the diamine component to the dicarboxylic acid component containing adipic acid is set within the range of from 0.995 to 1.005.

The apparatus used in the process of the present invention can be constructed at a very low cost, since a pressure vessel is unnecessary. In addition, according to the present invention, it is possible to shorten markedly the time required for the polycondensation reaction because the operations of controlling pressure and of distilling and removing water as a solvent are not required. These operations are required in the prior processes described hereinbefore. Furthermore, the present invention makes it possible to improve the yield of polyamide because it is possible to increase the charge of starting materials per batch. In addition, the process of the present invention requires no heat for the concentration of an aqueous solution. Thus, the present invention provides a very economical method for producing a polyamide by direct polycondensation reaction.

The examples set forth below describe specific embodiments of the present invention but do not limit the invention.

EXAMPLE 1

A 3 $m^3$ jacketed reaction vessel equipped with a stirrer, a partial condenser, a total condenser connected to the partial condenser, a thermometer, a dropping tank and a nitrogen gas-supplying pipe was charged with 731 Kg of adipic acid. Nitrogen gas was introduced into the reaction vessel through the nitrogen gas-supplying pipe to replace substantially the air in the vessel with the nitrogen gas and then adipic acid was uniformly melted by raising the temperature thereof to 160° C. while flowing a small amount of nitrogen gas. To the melt m-xylylene diamine was continuously added dropwise through the dropping tank with stirring. During the addition of the diamine, the temperature of the reaction mixture was continuously raised to 245° C. by passing heating medium having a temperature of 280° C. through the jacket. The time required for the rise of temperature was 3.5 hours. The amount of m-xylylene diamine added was 667.4 Kg. Water, which was being generated and evaporated with the addition of m-xylylene diamine, was distilled and removed from the reaction mixture through the partial condenser and then through the total condenser connected to the partial condenser.

Thereafter, the temperatures of the reaction mixture was raised to 260° C. over a period of 3 hours, and then a further 13.6 Kg of m-xylylene diamine was continuously added dropwise to the reaction mixture over a period of 50 minutes. After adding the diamine, the reaction was continued for another 1.0 hour at 260° C. to obtain the desired polyamide.

The total reaction time since commencing the addition of m-xylylene diamine was 8 hours and 20 minutes. Throughout the process of this reaction, the reaction mixture remained in a uniformly-fluidized state without any solidification and/or precipitation of the resulting oligoamide or polyamide.

The polyamide finally obtained had a relative viscosity of 2.16 as measured on a solution of 1 g of polymer in 100 ml of sulphuric acid (96% by weight) and a melting point of 243° C.

The molar proportion of m-xylylene diamine distilled and removed from the reaction mixture during the reaction was only 0.15% of the total amount of the added diamine.

EXAMPLE 2

The same reaction vessel was charged with 731 Kg of adipic acid. Nitrogen gas was introduced into the vessel to replace substantially the air in the vessel with the nitrogen gas and then adipic acid was uniformly melted by raising the temperature thereof to 160° C. while flowing a small amount of nitrogen gas. To the melt a mixture of m- and p-xylylene diamines in a molar ratio of 9/1 was continuously added dropwise with stirring. During the addition of the mixed diamine, the temperature of the reaction mixture was continuously raised to 245° C. by passing heating medium having a temperature of 280° C. through the jacket. The time required for the rise of temperature was 3.5 hours. The amount of the mixed diamine added was 660.6 Kg. Water, which was being generated and evaporated with the addition of the mixed diamine, was distilled and removed from the reaction mixture through the partial and total condensers.

Thereafter, the temperature of the reaction mixture was raised to 265° C. over a period of 3 hours, and then a further 20.4 Kg of the same mixed xylylene diamine as described above was continuously added dropwise to the reaction mixture over 60 minutes. After adding the mixed diamine, the reaction was continued for another one hour at 265° C. to obtain the desired polyamide.

The total reaction time was 8.5 hours. Throughout the process of this reaction, the reaction mixture remained in a uniformly-fluidized state without any solidification and/or precipitation of the resulting oligoamide or polyamide.

The polyamide finally obtained had a relative viscosity of 2.20 as measured in the same manner as in the Example 1 and a melting point of 245° C.

EXAMPLE 3

The same reaction vessel as in Example 1 was charged with 731 Kg of adipic acid. Nitrogen gas was introduced into the vessel to replace substantially the air in the vessel with the nitrogen gas. Then, the charged adipic acid was uniformly melted by raising the temperature thereof to 160° C. while flowing a small amount of nitrogen gas. To the melt 670.8 Kg of a mixture of m- and p-xylylene diamines in a molar ratio of 8/2 was continuously added dropwise over a period of 3.5 hours with stirring. During the addition of the mixed diamine, the temperature of the reaction mixture was continuously raised to 245° C. Water, which was being generated and evaporated with the addition of the mixed diamine, was distilled and removed from the reaction mixture through the partial condenser and total condenser.

Thereafter, the temperature of the reaction mixture was raised to 270° C. over a period of 3.5 hours, and then further 10.2 Kg of the same mixed xylylene diamine was continuously added dropwise to the reaction mixture over a period of 50 minutes. After adding the mixed diamine, the pressure of water vapor within the reaction vessel was decreased to 600 mmHg while maintaining the temperature of the reaction mixture at 270° C., and the reaction was continued for another 30 minutes.

The total reaction time was 8 hours and 20 minutes. Throughout the process of the reaction, the reaction mixture remained in a uniformly-fluidized state without any solidification and/or precipitation of the resulting oligoamide or polyamide.

The resulting polyamide had a relative viscosity of 2.27 as measured in the same manner as in Example 1 and a melting point of 255° C.

EXAMPLE 4

The same reaction vessel as in Example 1 was charged with 647 Kg of adipic acid and 50.6 Kg of sebacic acid. Nitrogen gas was introduced into the vessel to replace substantially the air in the vessel with the nitrogen gas and then both the acids were uniformly melted together by raising the temperature thereof to 155° C. while flowing a small amount of nitrogen gas. To the molten mixture of the acides m-xylylene diamine was continuously added dropwise with stirring. During the addition of the diamine, the temperature of the reaction mixture was continuously raised to 240° C. by passing heating medium having a temperature of 280° C. through the jacket of the reaction vessel. The time required for the rise of temperature was 3.5 hours. The amount of m-xylylene diamine added was 667.4 Kg. Water, which was being generated and evaported with the addition of m-xylylene diamine, was distilled and removed from the reaction mixture through the partial condenser and total condenser connected thereto.

Thereafter, the temperature of the reaction mixture was raised to 255° C. over a period of 2 hours, and then a further 13.6 Kg of m-xylylene diamine was continuously added dropwise to the reaction mixture over a period of 50 minutes. After adding the diamine, the reaction was continued for another one hour at 255° C.

The total reaction time was 7 hours and 20 minutes. Throughout the process of this reaction, the reaction mixture remained in a uniformly-fluidized state without any solidification and/or precipitation of the resulting oligoamide or polyamide.

The polyamide finally obtained had a relative viscosity of 2.08 as measured in the same manner as in the Example 1 and a melting point of 240° C.

COMPARATIVE EXAMPLE

The same reaction vessel as in the Example 1 was charged with 731 Kg of adipic acid. Nitrogen gas was introduced into the vessel to replace substantially the air in the vessel with the nitrogen gas and then adipic acid was uniformly melted by raising the temperature thereof to 160° C. while flowing a small amount of nitrogen gas. To the melt 681 Kg of m-xylylene diamine was continuously added dropwise with stirring. During the addition of the diamine, the temperature of the reaction mixture was continuously raised to 245° C. by passing heating medium having a temperature of 280° C. through the jacket. The time required for the rise of temperature was 4 hours. Thereafter, the temperature of the reaction mixture was raised to 260° C. over a period of about 6.5 hours to complete the reaction.

The total reaction time was about 10.5 hours. Throughout the process of this reaction, the reaction mixture remained in a uniformly-fluidized state without any solidification and/or precipitation of the resulting oligoamide or polyamide.

The polyamide finally obtained had a relative viscosity of 2.16 as measured in the same manner as in the Example 1 and a melting point of 243° C.

What is claimed is:

1. A process for preparing a polyamide from a reaction mixture comprising a diamine component containing at least 70 mole % of m-xylylene diamine and a dicarboxylic acid component containing at least 80 mole % of adipic acid at atmospheric pressure, comprising the steps of:
   (a) heating and melting the dicarboxylic acid component to produce a molten dicarboxylic acid component;
   (b) adding part of the diamine component to the molten dicarboxylic acid component from step (a) in an amount to bring the molar ratio of the diamine component to the dicarboxylic acid component to within the range of from 0.900 to 0.990 in the reaction mixture while raising the temperature of the reaction mixture to a temperature in the range of from a temperature lower than the melting point of the resulting polyamide to a temperature higher than said melting point by a degree not exceeding about 5° C., said temperature being such that the reaction mixture is maintained in a uniformly fluidized state throughout the process;
   (c) after the addition of the diamine in step (b) has been completed, raising the temperature of the reaction mixture to a temperature higher than the melting point of the resulting polyamide by a degree of about 10° to 35° C.; and (d) adding the remainder of the diamine component to the reaction mixture maintained at the temperature defined in step (c) in an amount to bring the overall molar ratio of the diamine component to the dicarboxylic acid component to within the range of from 0.995 to 1.005 to complete the polycondensation reaction.

2. The process according to claim 1 wherein the dicarboxylic acid component further contains one or more aliphatic dicarboxylic acids other than adipic acid.

3. The process according to claim 2 wherein the aliphatic acid is selected from the group consisting of succinic acid, glutaric acid, pimelic acid, suberic acid, azelaic acid, sebacic acid, undecanedioic acid, dodecanedioic acid, and a mixture thereof.

4. The process according to claim 1 wherein the diamine component further contains one or more diamines selected from the group consisting of an aliphatic diamine, an aliphatic diamine having an aromatic ring other than m-xylylene diamine, aromatic diamine and an alicyclic diamine.

5. The process according to claim 1 wherein the process reaction is effected under an atmosphere of an inert gas.

6. The process according to claim 5 wherein the inert gas is nitrogen gas.

7. The process according to claim 1 wherein, in the step (a), the dicarboxylic acid component is heated to 160° C. or higher.

8. The process according to claim 1 wherein the molar ratio of the diamine component to the dicarboxylic acid component to be attained in the step (b) is in the range of from 0.930 to 0.980.

9. The process according to claim 1 wherein the temperature of the reaction mixture is continuously raised to the temperature defined in each of the steps (b) and (c).

10. The process according to claim 1 wherein, in the step (b), the diamine is continuously added over a period of time ranging from about 0.5 to 10 hours.

11. The process according to claim 1 wherein, in the step (d), the diamine is continuously added over a period of time ranging from about 10 to 60 minutes.

12. The process according to claim 1 wherein starting components evaporated during the process are separated from water which is being generated and evaporated with the progress of the process by fractional distillation using a partial condenser and are returned to the reaction mixture.

* * * * *

UNITED STATES PATENT AND TRADEMARK OFFICE
CERTIFICATE OF CORRECTION

PATENT NO. : 4,438,257

DATED : March 20, 1984

INVENTOR(S) : MIYAMOTO et al

It is certified that error appears in the above-identified patent and that said Letters Patent is hereby corrected as shown below:

On the title page;

[73] Assignee: Change the corporate status of the assignee from "Mitsubishi Gas Chemical Co., Ltd.," to --Mitsubishi Gas Chemical Co., Inc.,--

Signed and Sealed this

Twenty-fifth Day of June 1985

[SEAL]

Attest:

DONALD J. QUIGG

Attesting Officer

Acting Commissioner of Patents and Trademarks